United States Patent Office 3,131,757
Patented May 5, 1964

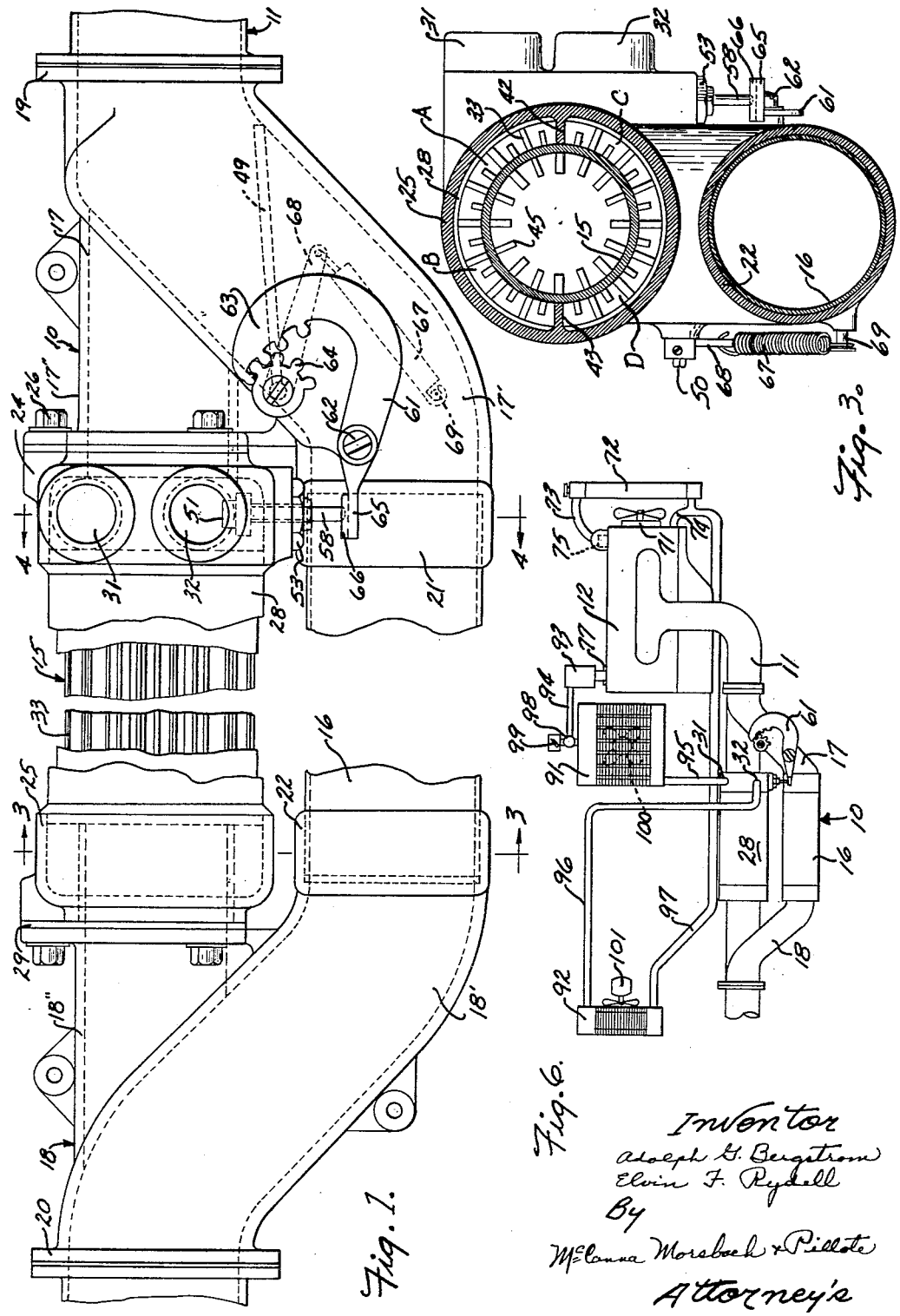

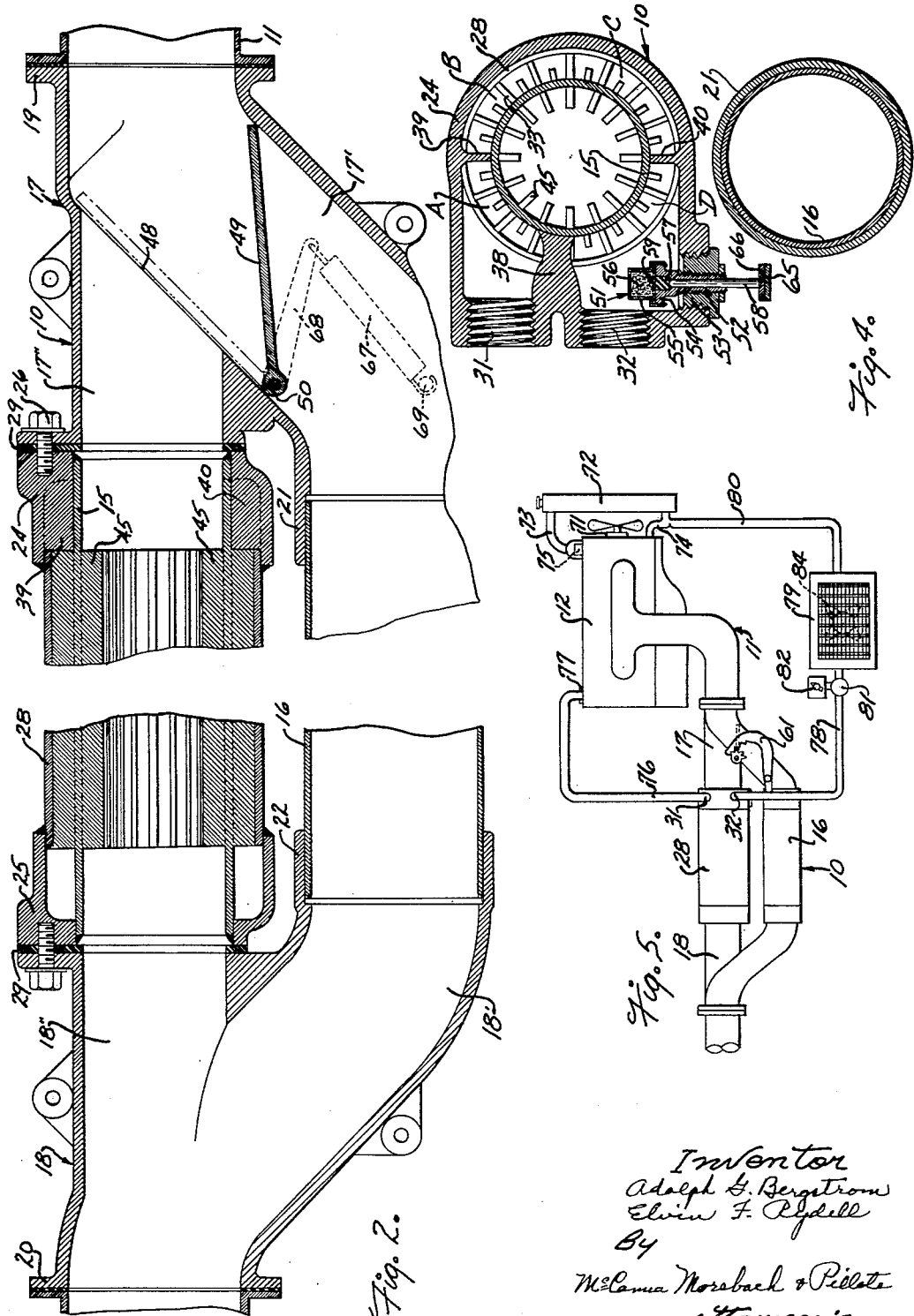

3,131,757
VEHICLE HEATING APPARATUS
Adolph G. Bergstrom and Elvin F. Rydell, Rockford, Ill., assignors to Bergstrom Manufacturing Co., Rockford, Ill., a corporation of Illinois
Filed Apr. 20, 1961, Ser. No. 104,460
4 Claims. (Cl. 165—35)

This invention relates to heating apparatus and particularly to a heating apparatus for use in an automotive vehicle.

An important object of this invention is to provide an improved heating system for use in an automotive vehicle which enables more reliable and accurate control of the temperature in the vehicle.

Another object of this invention is to provide a heating system for a vehicle having a liquid cooled engine and a vehicle space heater connected to the engine cooling system to be heated thereby, and which heating system has a temperature controlled auxiliary heat exchanger for reheating the liquid before it passes through the heater to maintain the liquid entering the heater at a preselected temperature notwithstanding variations in the temperature of the liquid in the engine or losses in heat from the liquid as it passes from the engine to the heater.

A further object of this invention is to provide a vehicle heating system connected to the engine cooling system in accordance with the foregoing object and wherein the heating system is so arranged that it does not adversely affect operation of the engine or the engine cooling system.

Yet another object of this invention is to provide an improved heat exchanger for use in the exhaust manifold of an internal combustion engine and which will efficiently and reliably heat the incoming liquid to a preselected temperature for use by the vehicle heater.

A more particular object of this invention is to provide a heat exchanger for use in the exhaust manifold of an internal combustion engine, and which heat exchanger has a valve for automatically passing the exhaust gases around the heat exchanger and an improved apparatus for automatically operating the valve in accordance with the temperature of the liquid at the outlet of the heat exchanger to by-pass the exhaust gases around the heat exchanger when the liquid reaches a preselected temperature.

These, together with various ancillary objects and advantages of this invention will be more readily appreciated as the same becomes better understood by reference to the following detailed description when taken in connection with the accompanying drawings wherein:

FIGURE 1 is a side elevational view of the heat exchange apparatus, with parts broken away and shown in section to illustrate details of construction;

FIG. 2 is a longitudinal sectional view through the heat exchange apparatus;

FIG. 3 is a transverse sectional view taken on the plane 3—3 of FIG. 1;

FIG. 4 is a transverse sectional view through the heat exchanger taken on the plane 4—4 of FIG. 1;

FIG. 5 is a diagrammatic view illustrating one vehicle heater system employing the heat exchange apparatus; and FIG. 6 is a diagrammatic view illustrating a modified form or vehicle heater system embodying the heat exchange apparatus.

The heat exchange apparatus designated generally by the numeral 10 is specifically adapted for use in the exhaust line 11 of an internal combustion engine 12. The heat exchange apparatus includes a heat exchanger tube 15 adapted to have the exhaust gases pass therethrough and a by-pass tube or pipe 16. The heat exchanger tube and by-pass tube are connected in the exhaust line by first and second generally Y-shaped fittings 17 and 18 having means such as the flanges 19 and 20 at relatively opposite ends thereof for attaching the same to the engine exhaust line. As best shown in FIG. 2, legs 17' and 18' of the fittings 17 and 18 are formed with integral collars 21 and 22 which slidably receive the ends of the by-pass tube 16. A pair of end caps or headers 24 and 25 are detachably connected to the other legs 17" and 18" of the fittings by means of bolts 26 and are insulated and sealed to the respective fitting by a gasket 28 formed of a heat-resistant material such as asbestos.

The heat exchanger tube 15 is secured to the end caps or headers 24 and 25 as by welding and is preferably formed with a cross-sectional area substantially equal to that of the engine exhaust line to avoid restricting the flow of exhaust gases therethrough. A water jacket is formed around the heat exchanger tube 15 and includes an outer jacket tube 28 which is secured to the end caps or headers 24 and 25 to extend therebetween in spaced relation to the heat exchanger tube. With the above described arrangement, the heat exchanger tube, the jacket tube 28 and the end caps 24 and 25 can be welded together as a sub-assembly and thereafter mounted on the end fittings 17 and 18. Moreover, it will be noted that when the end fittings are secured to the end caps 24 and 25, the sub-assembly including the heat exchanger tube and water jacket holds the end fittings 17 and 18 in assembled relation with the by-pass 16.

Inlet and outlet ports 31 and 32 are formed in one of the end caps 24 to introduce and withdraw liquid from the jacket around the heat exchanger tube 15. In order to assure reliable heating of the liquid to a preselected temperature, provision is made for directing the liquid longitudinally of the heat exchanger tube 15 back and forth a number of times to provide prolonged contact between the liquid and the heat exchanger tube. For this purpose, the heat exchanger tube is advantageously formed with a multiplicity of outwardly projecting fins 33, at least some of which extend outwardly into engagement with the outer water jacket 28 to separate the jacket into longitudinally extending passages. In the embodiment illustrated, the water jacket is arranged so that the liquid makes four passes along the length of the water jacket as it flows from the inlet to the outlet. For this purpose, the outwardly extending fins 33 are cut off from the end portions of the heat exchanger tube and the end caps or headers 24 and 25 are formed with inwardly projecting partitions which control the flows between the ends of the flow passages defined by the ribs 33. As shown in FIG. 4, the end cap 24 has a partition 38 extending into engagement with the heat exchanger tube 15 and into engagement with the end of at least one rib 33 thereon to separate the inlet and outlet ports 31 and 32. The end cap 24 also has oppositely extending partitions 39 and 40 disposed approximately 180° apart and which also extend into engagement with the heat exchanger tube 15 and the end of a different one of the ribs 33. Thus, liquid entering at the inlet port 31 flows through the passages between the ribs 33 in one quadrant designated A and then longitudinally of the heat exchanger into the other cap 25. The cap 25 is also provided with a pair of oppositely disposed inwardly extending ribs 42 and 43 oriented at 90° with respect to the ribs 39 and 40 and which engage the heat exchanger tube 15 and the ends of certain ones of the ribs 33. The liquid which enters the cap 25 and the quadrant A thus flows crosswise of the cap 25 of the quadrant B and then longitudinally of the heat exchanger into the cap 24. The fluid entering the cap 24 in quadrant B flows around the cap into the quadrant C and then rearwardly through the exchanger to the cap 25. The fluid in the cap 25 entering at quadrant C flows around into quadrant D and then forwardly again to the outlet port 32. This arrangement wherein the fluid passes several times along the heat exchanger provides prolonged contact between the fluid and the heat exchanger tube to assure more reliable heating of the liquid. In addition, a multiplicity of inwardly extending ribs designated 45 are advantageously formed on the inner periphery of the exchanger tube for contact with the exhaust gases to improve the heat transfer between the exhaust gases and the liquid. In the embodiment illustrated, the heat exchanger tube 15 and the fins 33 and 45 are conveniently formed in a simple extrusion. If desired, the extrusion can be shaped to also form the water jacket tube 28 integrally with the fins 33 and the heat exchanger tube 15.

Provision is made for controlling the flow of exhaust gases through the heat exchanger tube 15 to regulate the temperature of the liquid at the outlet of the exchanger. As best shown in FIG. 2, the fitting 17 has a shoulder or seat 48 formed at the intersection of the legs 17' and 17" and a diverter valve 49 is mounted for swinging movement on a pintle 50 between a position shown in solid lines in FIG. 2, blocking the by-pass and a position shown in phantom in FIG. 2 against the seat 48 blocking flow through the heat exchanger. A temperature responsive operator is provided for moving the diverter valve to a position blocking flow through the heat exchanger tube, when the temperature of the liquid at the outlet of the heat exchanger reaches a preselected value.

The temperature responsive operator is best shown in FIG. 4 and is of the type having an expansible chamber with a thermally expansible material therein which expands at a preselected temperature and moves an actuator rod. More particularly, the operator 51 includes a stem 52 which is mounted in a bushing 53. The bushing 53 is threadedly mounted in an opening in the fitting 17 and the stem has a head 54 extending into the chamber in the end cap 24 adjacent the outlet opening 32. A cover 55 is attached to the head and defines a chamber therewith containing a thermally expansible material 56. The expansion of the material 56 is transmitted through a resilient element 57 to the actuator rod 58 which is slidably disposed in the stem 52. A diaphragm 59 may be provided for sealing the expansible material in the chamber. The expansible material is preferably of the type which changes its state, that is from a solid to a liquid or from a liquid to a gas at a preselected temperature to provide relatively rapid movement of the rod 58.

Thermally responsive operators of the foregoing type provide relatively large forces for moving the rod 58, but have a relatively low amplitude of movement and provision is made for amplifying the movement of the rod and for transmitting the same to the diverter valve 49 to move the latter to a position blocking flow through the heat exchanger tube. As shown in FIG. 1, a lever 61 is pivotally mounted on a pin 62 attached to the fitting 17. The pin 62 is spaced from the pivot pin 50 of the diverter valve and the lever is formed with an arcuate sector gear 63 at one end which meshes with a pinion 64 non-rotatably attached to the pin 50. Thus, as the lever 61 is moved in a counter clockwise direction from the position shown in FIG. 1, the sector gear 63 operates the pinion 64 to move the diverter valve from a position blocking flow through the by-pass to a position blocking flow through the heat exchanger tube. The actuator rod 58 is arranged to engage the other end portion 65 of the lever and, as shown, a wear pad 66 is mounted on the end portion 65. A tension spring 67 (see FIGS. 1 and 3) is connected at one end to a lever 68 non-rotatably attached to the pivot pin 50 and at the other end to an anchor pin 69 to normally urge the rod 58 to its retracted position and to yieldably urge the diverter valve 49 to a position blocking flow through the by-pass.

The heat exchange apparatus of the present invention can be employed in a heating system which is separate from the engine cooling system. However, in such an application, the heat exchanger must supply all of the heat for the heating system. In accordance with the present invention, the heat exchanger is advantageously used in a heating system which is connected to the engine cooling system so that the heat exchanger need only supply the additional increment of heat necessary to bring the liquid up to the desired temperature for use in the vehicle heater. The engine 12 has a conventional liquid cooling system including cored passages in the engine (not shown), a pump 71 for circulating the cooling liquid through the engine, a radiator 72 which is connected to the engine through outlet and return passages 73 and 74, and a thermostat 75 for regulating the flow of cooling liquid from the engine to the radiator 72. As is conventional, the engine thermostat remains closed to prevent circulation of the cooling liquid through the radiator until the temperature of the liquid reaches a preselected range, for example, 140°–160° in the summer and 160°–180° in the winter, and the thermostat opens in that temperature range to permit circulation of the cooling liquid through the radiator to cool the same. The heat transferred from the engine to the cooling liquid varies with the load on the engine and, when the load is high as when the vehicle is climbing a hill, the engine cooling liquid is generally heated to a temperature adequate for satisfactory operation of the vehicle heater. However, when the engine is not under a high load, such as when the engine is idling or the vehicle is going down a long hill, the temperature of the cooling liquid drops substantially and is frequently insufficient to provide satisfactory heating of the vehicle. As shown in FIG. 5, the heat exchanger inlet 31 is connected through a conduit 76 to a fitting 77 on the engine which communicates with the pressure side of the engine cooling system. The outlet 32 of the heat exchanger is connected through a conduit 78 to the inlet of the vehicle heater 79 and the outlet of the vehicle heater is connected through a conduit 80 to the return line 74 of the engine cooling system. With this arrangement, the engine radiator 72 functions as a reservoir for the vehicle heating system and the engine preheats the liquid to a somewhat variable temperature determined by the load on the engine. The preheated liquid then flows through the heat exchanger which raises the temperature of the liquid to the desired level. When the temperature of the liquid at the outlet of the heat exchanger reaches a preselected value, the thermally responsive operator 51 moves the diverter valve 49 to a position blocking flow of exhaust gases through the heat exchanger to thereby automatically regulate the temperature of the liquid and prevent overheating. The exhaust temperature is also decreased with decreases in load on the engine. However, the heat exchanger is made sufficiently large, as by suitable selection of the length of the heat exchange tube 15 and water jacket 28 to provide adequate heating of the engine even when the vehicle is operating under a very low load. The heat responsive operator 51 automatically controls the diverter valve to regulate the rate of flow of exhaust gases through the heat exchanger and supply the proper amount of heat to the water jacket. In order to avoid any adverse effect on the engine cooling system due to the inclusion of the "boost" heat exchanger therein, the thermally responsive operator 51 is preferably arranged to operate in the same range of temperatures as the engine thermostat 75. Therefore, when the temperature of the cooling liquid at the outlet of the engine reaches the preselected range, for example, 140°–160°, this liquid is supplied to the heat exchanger and operates the operator 51 to close and block flow through the heat exchanger tube 15 to thereby avoid supplying additional heat to the engine cooling liquid. The auxiliary heat exchanger thus also aids in maintaining a substantially uniform temperature on the engine 12.

The temperature in the vehicle is regulated by a liquid flow control valve 81 which regulates the flow of liquid through the heater 79. The flow control valve can be manually operated as by a knob 82, or thermostatically operated by a suitable thermostat responsive to the temperature of the space in the vehicle. As will be noted, the restriction of the flow through the heater also reduces the rate of flow of the liquid through the heat exchanger. As the flow through the heat exchanger is reduced, less heat is required to heat the same to the desired temperature and the diverter valve is automatically operated to reduce the rate of flow through the heat exchanger. Thus, changes in setting of the liquid control valve 81 automatically produce coresponding changes in the position of the diverter valve to maintain proper temperature control. As is conventional, the heater 79 employs a fan 84 for directing air through the heater to be heated thereby.

A modified form of heating system employing the heat exchanger of the present invention and connected with the engine cooling system is illustrated in FIG. 6. The heat exchanger and engine and cooling system therefore are the same and like numerals are utilized to designate corresponding parts. This engine cooling system is designed for use in vehicles which use more than one heater. As shown in FIG. 6, the heating system employs two or more heaters designated 91 and 92. One heater such as 91 is commonly mounted on the end of the vehicle adjacent the engine 12 and the other heater or heaters are located relatively remote from the engine. In the past, considerable difficulty has been encountered in maintaining adequate heat at the relatively remote heaters. As shown, liquid from the pressure side of the engine cooling system is supplied through the fitting 77 and preferably through a boost pump 93 conduit 94 to the inlet of one heater 91. The outlet of the heater is connected through a conduit 95 to the inlet 31 of the heat exchanger, the outlet of the heat exchanger being connected through a conduit 96 to the inlet of a second heater 92. The outlet of the second heater is connected through a return line 97 to the return line 74 of the engine cooling system. With this arrangement, the engine cooling liquid is delivered first to the heater 91 and a portion of the heat is extracted therefrom. The cooled liquid is then supplied to the heat exchanger which raises the temperature of the liquid back up to the desired level before the liquid is supplied to the second heater 92. It is frequently possible to locate the heat exchanger relatively close to the second heater 92 and the heat exchanger therefore supplies an additional increment of heat to the liquid sufficient to compensate for any deficiency in the temperature of the liquid at the outlet of the motor below the desired temperature; the loss in heat from the liquid as it passes through the heater 91, and for at least a part of the loss of heat due to the cooling effect on the conduits 95 and 94 leading from the motor to the heat exchanger. As in the preceding embodiment, a liquid flow regulating valve 98 is provided for regulating the rate of flow and hence the heat output of the heaters. Since the heaters 91 and 92 are effectively connected in series, a single flow regulating valve 98 will regulate the rate of flow to both of the heaters and hence regulate the temperatures of both heaters. The regulating valve can be either manually controlled as by a knob 99 or by a thermostat, as desired. In order to avoid an adverse effect on the engine cooling system the heat exchanger operator is also advantageously arranged to operate in the same range of temperatures as the engine thermostat. Fans 100 and 101 are provided for directing the flow of air through the respective heaters 91 and 92, as is conventional.

We claim:

1. A heat exchanger for use in the exhaust line of an internal combustion engine comprising;

first and second generally Y-shaped fittings each having a first tubular leg at one end adapted for connection to an exhaust line and second and third tubular legs at the other end each communicating with the respective first tubular leg;

a liquid jacket unit including inner and outer elongated tubular sections and headers secured to opposite ends of the inner and outer sections to form a liquid jacket around the inner tubular section, said tubular sections having fins extending therebetween and defining flow passage extending along the length of the liquid jacket;

means detachably securing the headers on opposite ends of said liquid jacket unit to said second legs of each said first and second fittings to allow said liquid jacket unit to be installed and removed as a unitary subassembly from said fittings, said jacket unit extending between said fittings and having said inner tubular section communicating with said second legs to allow exhaust gases to pass therethrough;

a by-pass tube mounted on said third legs of said first and second fittings in communication therewith and extending between said fittings generally parallel to said liquid jacket unit;

the header which is attached to said first fitting defining an outlet flow chamber communicating with the flow passage in the liquid jacket and having a liquid outlet passage communicating with said outlet flow chamber, one of said headers having a liquid inlet passage therein;

an exhaust gas diverter valve in said first fitting having shaft means rotatably supporting the diverter valve on said first fitting for swinging movement between a position blocking flow through said third leg of said first fitting and a position blocking flow through said second leg of said first fitting;

the one header attached to said first fitting having an opening therein communicating with said outlet flow chamber, a temperature responsive operator carried by said liquid jacket unit including a body mounted in said opening in said one header, said operator having a temperature sensing portion attached to said body and extending into said outlet flow chamber and a reciprocable member slidably mounted on the body and operatively connected to said temperature sensing portion for movement thereby, said reciprocable member having an outer end portion disposed outside said one header;

and valve actuator means mounted on the outer side of said first fitting and operatively connecting said outer end portion of said reciprocable member to said shaft means on the diverter valve for moving the diverter valve from a position blocking flow to said third leg of said first fitting to a position blocking flow to said second leg of said first fitting when the temperature of the liquid in said outlet flow chamber reaches a preselected value.

2. A heat exchanger for use in the exhaust line of an internal combustion engine comprising;

first and second generally Y-shaped fittings each having a first tubular leg at one end adapted for connection to an exhaust line and second and third tubular legs at the other end each communicating with the respective first tubular leg, said second legs each having a flange at the end thereof and said third legs having sleeve portions at the ends thereof;

a liquid jacket unit including inner and outer elongated tubular sections and headers secured to opposite ends of the tubular sections to form a liquid jacket around the inner tubular section, said tubular sections having fins extending therebetween defining flow passages extending along the length of the liquid jacket;

fasteners detachably securing the headers on opposite ends of the liquid jacket unit to the flanges on said second legs of each said first and second fittings to allow said liquid jacket unit to be installed and removed as a unitary sub-assembly from said fittings, said jacket unit extending between said first and second fittings and having said inner tube section communicating with said second legs of said fittings to allow exhaust gases to pass therethrough;

a by-pass tube telescopically fitted on said sleeve portions on said third legs in communication therewith and extending between the fittings generally parallel to said liquid jacket unit;

the header which is attached to said first fitting defining an outlet flow chamber communicating with the flow passages in the liquid jacket and having a liquid outlet passage communicating with said outlet flow chamber, one of said headers having a liquid inlet passage therein;

an exhaust gas diverter valve in said first fitting having shaft means rotatably supporting the diverter valve on said first fitting for swinging movement between a position blocking flow through said third leg of said first fitting and a position blocking flow through said second leg of said first fitting;

the one header attached to said first fitting having an opening therein communicating with said outlet flow chamber, a temperature responsive operator carried by said liquid jacket unit including a body mounted on said one header in said opening, said operator having a temperature sensing portion extending into said outlet flow chamber and a reciprocable member slidably mounted in said body and operatively connected to said temperature sensing portion for movement thereby, said reciprocable member having an outer end portion disposed outside said one header;

and valve actuator means mounted on the outer side of said first fitting and operatively connecting said outer end portion of said reciprocable member to said shaft means on the diverter valve for moving the diverter valve from a position blocking flow to said third leg of said first fitting to a position blocking flow to said second leg of said first fitting when the temperature of the liquid in said outlet flow chamber reaches a preselected value.

3. A heat exchanger for use in the exhaust line of an internal combustion engine comprising;

first and second generally Y-shaped fittings each having a first tubular leg at one end adapted for connection to an exhaust line and second and third tubular legs at the other end each communicating with the respective first tubular leg;

a liquid jacket unit including inner and outer elongated tubular sections and generally annular headers secured to opposite ends of the inner and outer sections to form a liquid jacket around the inner tubular section, said tubular sections having fins extending therebetween and defining separate annularly spaced flow passages extending along the length of the liquid jacket unit, said headers each defining chambers communicating with the flow passages at the respective ends of the tubular sections, one of said headers having liquid outlet and inlet passages therein and partition means separating the chamber therein into inlet and outlet compartments communicating with different ones of the flow passages to direct the liquid lengthwise of the jacket unit at least several times as it passes from the inlet passage to the outlet passage;

means detachably securing said one of said headers to said second leg of said first fitting, means detachably securing the other of said headers to said second leg of said second fitting, said liquid jacket unit extending between said fittings with said inner tubular section communicating with said second legs of said first and second fittings to allow exhaust gases to pass therethrough, said jacket unit being removable as a unitary sub-assembly from said fittings;

a by-pass tube mounted on said third legs of said first and second fittings in communication therewith and extending between said fittings generally parallel to said liquid jacket unit;

an exhaust gas diverter valve in said first fitting having shaft means rotatably supporting the diverter valve on said first fitting for swinging movement between a position blocking flow through said third leg of said first fitting and a position blocking flow through said second leg of said first fitting;

said one header having an opening communicating with said outlet compartment;

a temperature responsive operator carried by said liquid jacket unit including a body mounted on said one header in said opening, said operator having a temperature sensing portion attached to the body and extending into said outlet compartment and a reciprocable member slidably mounted on the body and operatively connected to said temperature sensing portion for movement thereby, said reciprocable member having an outer end portion disposed outside said one header;

and valve actuator means mounted on the outer side of said first fitting and operatively connecting said outer end portion of said reciprocable member to said shaft means on said diverter valve for moving the diverter valve from a position blocking flow to said third leg of said first fitting to a position blocking flow to said second leg of said first fitting when the temperature at said outlet compartment reaches a preselected value.

4. The combination of claim 3 wherein said actuator means comprises a lever, means engaging the lever intermediate its ends pivotally mounting the lever on said first fitting for movement about an axis paralleling the axis of said shaft means, means on one end of the lever engaging said reciprocable member for movement thereby, and means on the other end of said lever operatively connecting the same to said shaft means to turn the shaft means in response to movement of said lever.

References Cited in the file of this patent

UNITED STATES PATENTS

| | | |
|---|---|---|
| 902,148 | Greenfield | Oct. 27, 1908 |
| 1,127,621 | Hesch | Feb. 9, 1915 |
| 1,159,566 | Brigel | Nov. 9, 1915 |
| 1,251,317 | Wright | Dec. 25, 1917 |
| 2,038,193 | Parsons | Apr. 21, 1936 |
| 2,191,177 | McCollum | Feb. 20, 1940 |
| 2,362,985 | Brown | Nov. 21, 1944 |
| 2,521,393 | Messinger | Sept. 5, 1950 |
| 2,670,933 | Bay | Mar. 2, 1954 |
| 2,809,810 | Carroll et al. | Oct. 15, 1957 |
| 2,879,976 | Rose | Mar. 31, 1959 |
| 2,890,866 | Hansen | June 16, 1959 |
| 2,987,788 | Lyman | June 13, 1961 |
| 3,036,818 | Legrand | May 29, 1962 |

FOREIGN PATENTS

| | | |
|---|---|---|
| 531,718 | Canada | Oct. 16, 1956 |